F. BLEWER.
LOG RAFT.
APPLICATION FILED APR. 3, 1920.

1,360,361. Patented Nov. 30, 1920.

INVENTOR
Fred Blewer
BY
ATTORNEY

UNITED STATES PATENT OFFICE.

FRED BLEWER, OF PORT BLAKELY, WASHINGTON.

LOG-RAFT.

1,360,361. Specification of Letters Patent. Patented Nov. 30, 1920.

Application filed April 3, 1920. Serial No. 371,085.

*To all whom it may concern:*

Be it known that I, FRED BLEWER, a citizen of the United States, residing at Port Blakely, in the county of Kitsap and State of Washington, have invented certain new and useful Improvements in Log-Rafts, of which the following is a specification.

This invention relates to log-towing devices, and its object is to simplify and otherwise perfect apparatus of this character to afford inexpensive, convenient and reliable means for assembling and floatingly transport piling, saw logs, etc.

The invention is primarily designed for use in towing small quantities of logs for short distances as in supplying pile timber, or float-logs for the construction or repair of fish traps, although it may advantageously be used for other purposes as, for example, in collecting and returning drift logs which have escaped from a raft or boom in transit.

The invention consists in towing apparatus comprising a main line or hauling rope and supplementary ropes secured intermediate their lengths thereto by suitable knots to afford leaders having log engaging dogs connected to their outer ends.

The invention in its form now preferred by me is illustrated in the accompanying drawings, of which—

Figure 1:
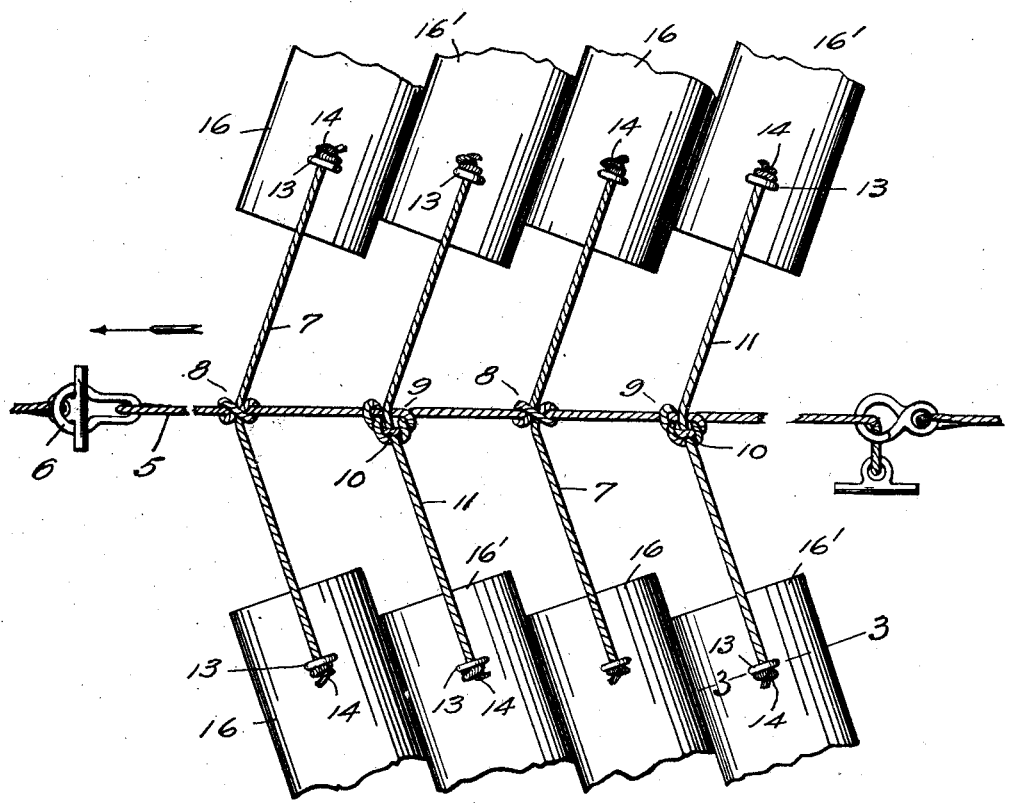
Figure 1 is a plan view of my improved apparatus shown applied.

In said drawings, the reference numeral 5 represents a main-rope or hauling-line of suitable length and which, for convenience in connecting the same to a tow-line, is desirably provided at its forward end with a loop or link 6. In spaced relations upon the main line are secured a plurality of ropes 7 by means of bends 8 intermediate their respective lengths. Such bends, as illustrated, are in the nature of knots, conventionally known as "two half-hitchers".

Between its connections with the ropes 7, the main line 5 is formed or bent on itself to afford what are known as "clove hitches" 9 through which extend looped portions 10 to receive ropes 11 which serve to prevent the untying of the clove hitches.

The parts or leads of the ropes 7 and 11 provided at opposite sides of the main line are respectively passed through the eyes, as 12, of metal timber-dogs 13 and are prevented from withdrawal by the provision of knots 14 in the ends of the respective leads.

Said dogs are provided with tapering shank elements 15 which are driven into logs 16 and $16^1$ in proximity to an end of each.

By pulling the main line 5 in the direction of arrow (Fig. 1) the various leads of the ropes 7 and 4 exercise pulls upon the respective logs to cause the latter to assume approximately the positions in which they are represented in Fig. 1, when all of such ropes are utilized under ordinary towing conditions.

Figure 2:
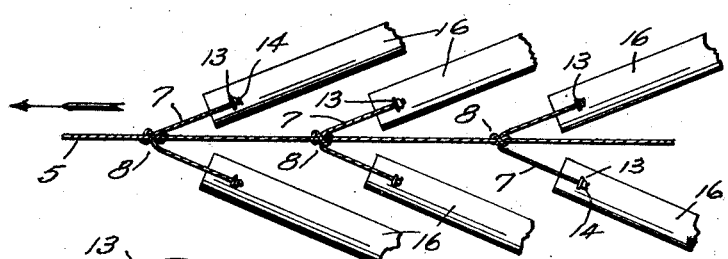
Fig. 2 is a view similar to Fig. 1 with the alternate pairs of logs and the leaders therefor omitted.
Figure 4:
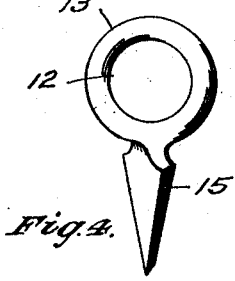
Fig. 4 is a perspective view of a timber-dog shown detached.
Figure 3:
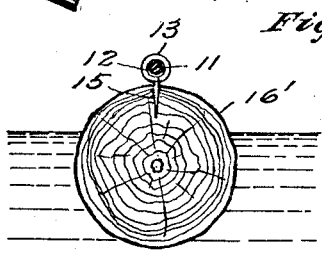
Fig. 3 is a sectional view taken substantially through 3—3 of Fig. 1.

When towing through a narrow or sinuous channel the ropes 11 and the associated logs $16_1$ may be removed, whereupon the remaining logs 16 are free to swing rearwardly as shown in Fig. 2 to provide a narrow and more flexible raft structure.

By loosening the clove hitches 9 on the main line 5 the respective bends or loops 10 may be quickly enlarged for the removal of the ropes 11 with the associated timber dogs, whereupon the main line straightens out when subjected to a lengthwise pull.

The hauling apparatus by being made of rope is flexible throughout and when unemployed may be conveniently stowed in compact bulk upon a towing vessel. The connections between the leader ropes and the main line are such that they may be quickly loosened for removal or adjustment lengthwise of the main line to accommodate various sizes of logs or a desired size of raft.

By provision of dogs, the rope leads are readily secured to logs without the use of bridles, or "choker-lines" and obviates, moreover, the necessity of boring holes in the logs to enable the several rope-leads to be secured thereto.

What I claim is—

1. In log-rafting apparatus, the combination of a hauling-line, ropes secured thereto by tying knots in the respective ropes, and means connected to the ropes and adapted to be driven into logs for securing the ropes thereto.

2. In log-rafting apparatus, the combination of a hauling-line, ropes tied to said hauling-line and affording branches to the hauling-line, and log dogging means provided on the respective branches.

3. In log-rafting apparatus of the class described, the combination of a hauling-line, a plurality of ropes secured by knots to said hauling line whereby each rope affords two branches to said hauling-line, and means connected to the respective branches and adapted to be driven into logs for securing the latter to said branches.

4. In log-rafting apparatus, the combination of a main line and two series of ropes connected thereto intermediate their respective lengths to afford leaders at opposite sides of the main line, the ropes of one of said series being tied by knots provided thereon to said main line, the ropes of the other series being secured to the main line by knots provided in the latter, and means for securing the leaders individually to logs for towing the same.

Signed at Seattle, Washington, this 20th day of March, 1920.

FRED BLEWER.

Witnesses:
PIERRE BARNES,
ELIZABETH JOHNSON.